United States Patent

[11] 3,556,190

[72] Inventor John M. Riches
Castle Bromwich, near Birmingham, England

[22] Filed Apr. 10, 1968
[45] Patented Jan. 19, 1971
[73] Assignee The Dunlop Company Limited
London, England
a British Company
[32] Priority Apr. 21, 1967
[33] Great Britain
[31] 18351/67

[54] PNEUMATIC TIRES
4 Claims, 3 Drawing Figs.

[52] U.S. Cl. .......... 152/209
[51] Int. Cl. .......... B60c 11/06
[50] Field of Search .......... 152/209

[56] References Cited

UNITED STATES PATENTS

| | | | |
|---|---|---|---|
| 2,121,955 | 6/1938 | Eger | 152/209 |
| 2,322,505 | 6/1943 | Bull | 152/209 |
| 2,840,143 | 6/1963 | Robertson | 152/209 |

*Primary Examiner*—Arthur L. La Point
*Attorney*—Stevens, Davis, Miller & Mosher

ABSTRACT: A pneumatic tire provided with a plurality of generally circumferentially-extending grooves all of which are narrow in width, and some of which are provided along the bases thereof with bulbous channels to increase the tread stability and reduce the rate of tread wear without impairing the tread drainage capacity.

PNEUMATIC TIRES

This invention relates to pneumatic tires.

The operation of pneumatic tires in wet conditions requires the rapid removal of water from between the contact area of the tire tread and the road. That water which is not bodily displaced by the bulk of the tire in the form of a bulk "bow wave" displacement as it rolls along the ground can at least partly be drained into grooves or slots formed in the tire tread.

It has been found, however, that the provision of a plurality of wide grooves, which are effective in large volume drainage of water, disadvantageously reduces the amount of tread rubber, for a given width of tire, available for wear and vehicle support. In addition, wide grooves isolate areas of rubber which are more easily deformable than are areas of rubber separated only by narrow grooves since with narrow grooves the grooves can close up, under load in the contact area, to bring about mutual support of the rubber in the regions of the narrow grooves; the more rigid the support for the tread rubber the less the rate of wear experienced.

According to the invention there is provided a pneumatic tire having a tread portion comprising generally circumferentially-extending drainage grooves all of which are of narrow width at or adjacent to the ground-contacting surface and some at least of which are provided with channel portions of substantially increased relative width at or adjacent to the groove base.

The tire may be provided with lateral slots connecting with the narrow circumferential grooves and the slots may be linear or may be angled to form an L-shape in plan view. In addition, some or each of the narrow circumferential grooves may be provided with substantially radially-extending conduits, of greater transverse width than that of the narrow groove, leading from the tread ground-contacting surface into the channel portions, the narrow circumferential groove thus being provided with local portions of larger dimensions for the flow of water into the channel portion.

It will be appreciated that according to the invention the portions of the tire tread for the removal of water in substantial quantity are, in the unworn tire, submerged below the ground-contacting surface while, when the tire is substantially worn, the submerged channels are revealed to provide a good drainage action which is substantially better than would be provided by a narrow slot design devoid of submerged channels. The circumferential nature of the grooves provides a long peripheral continuous channel and the clearance of this long channel is effected by the action of centrifugal set up by the rotating tire.

It will also be appreciated that great advantage is obtained from the provision of narrow circumferential grooves in the unworn tire since they tend to close together as they enter the contact patch and when under sufficient load actually lie in abutment to provide a mutual support for the ribs on each side of the grooves, in the ground-contacting patch of the tire and so reduce the tread-wearing action. Thus both good drainage in worn and unworn conditions is obtained together with a low rate of tread wear.

The invention is applicable to car, truck and giant sizes of pneumatic tires and to such tire with either radial or cross-bias carcasses.

The invention relates to tires with generally circumferentially-extending narrow grooves and this term is understood to include undulating generally circumferential grooves e.g. zigzag grooves and also grooves which extend at a small angle of inclination around the tire periphery from one side of the tread to the other.

In the case when the generally circumferentially-extending grooves undulate, the peaks of adjacent undulating grooves may be skewed axially of the tire.

It will be noted that the invention is referred to as being applicable to a tread having circumferential grooves which are narrow in width and this relative term is used in relation to the increased width at the groove base; in a giant tire the narrow portion of the groove may be fifty-thousandths of an inch for a tire size of 9.00 × 20 and for a car tire the corresponding dimension may be forty-thousandths of an inch for a tire size of 185 × 15.

Tire treads according to the invention may incorporate in addition to the circumferential narrow grooves transverse narrow slots interconnecting the circumferential grooves, the narrow slots having submerged channel portions leading into those provided adjacent to the bases of the narrow circumferential grooves. These transverse narrow slots may further be provided with a radially-extending conduit or conduits as earlier referred to in respect of the circumferential narrow grooves.

One embodiment of the invention will now be described by way of example with reference to the accompanying drawings wherein.

Figure 1:
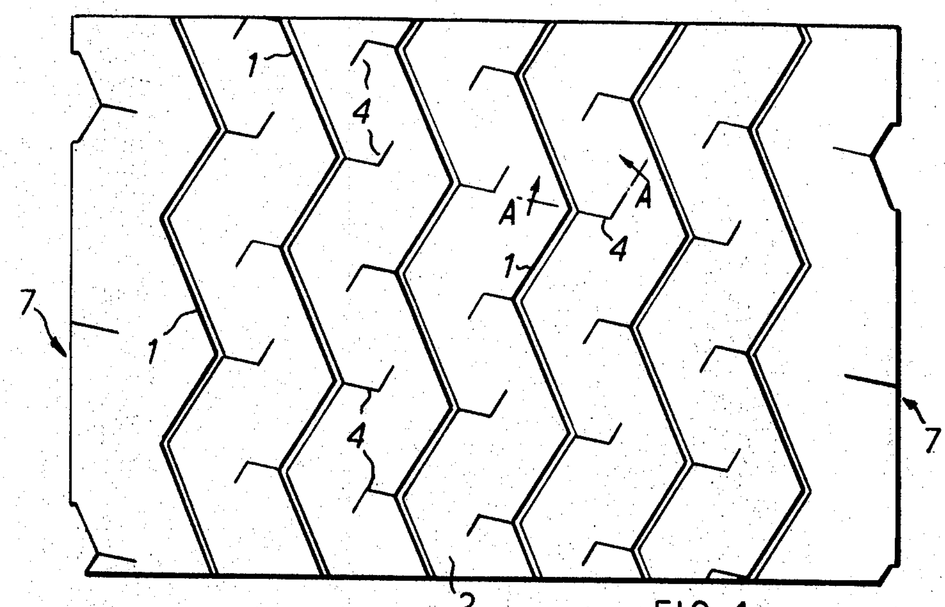
FIG. 1 is a plan view of a tire showing the first embodiment.

According to one embodiment of the invention shown in FIG. 1 a radial carcass giant tire construction of size 9.00 × 20 is provided with seven generally circumferential zigzag ribs 2. Each of the ribs 2 is separated from an adjacent rib or ribs by means of a narrow zigzag groove 1 of approximately half an inch deep, i.e., substantially the whole depth of the tread rubber. Each of the grooves 1 has a narrow portion 6 extending about two-thirds of its depth radially inwardly from the tread surface and is fifty-thousandths of an inch wide, the remainder of each groove, to the base, being of relatively increased width and constituting a channel portion 5 of width 0.15 inches.

For each of the grooves 1 nearest the shoulders 7 of the tire each alternate peak of the zigzag groove form is provided with a substantially L-shaped slot 4 which communicates with the narrow circumferential groove 1, the slots 4 projecting from the axially inner side of the groove. For the remainder of the grooves 1 the arrangement is similar except that not only alternate zigzag peaks are provided with slots 4 but each peak is provided with a slot, one slot projecting in one generally axial direction and the next adjacent slots projecting in the opposite generally axial direction for each groove, the arrangement being such that the slots 4 projecting laterally from one narrow circumferential groove 1 interdigitate with those of an adjacent circumferential groove. The slots 4 are thirty-thousandths of an inch wide.

In operation of the tread portion of the tire just described, in some parts at least of the contact area of the tire, under load, the narrow circumferential grooves 1 close up together to provide mutual support between adjacent ribs 2 and so reduce the deflection of ribs 2 in operation compared with an unsupported arrangement thus reducing the rate of tread wear. When the tire operates under wet conditions, that water which is not displaced by the bow wave effect of the tire passing over the wet surface either is fed by the narrow circumferential grooves 1 into the submerged channels 5 for bulk drainage of water or is taken up by the transverse slots 4. Some of the water which enters the slots 4 can lead into the submerged channels. As the portion of the tread which has absorbed water rolls out of the contact path the centrifugal rotational force throws the water clear of the tire.

Figure 2:
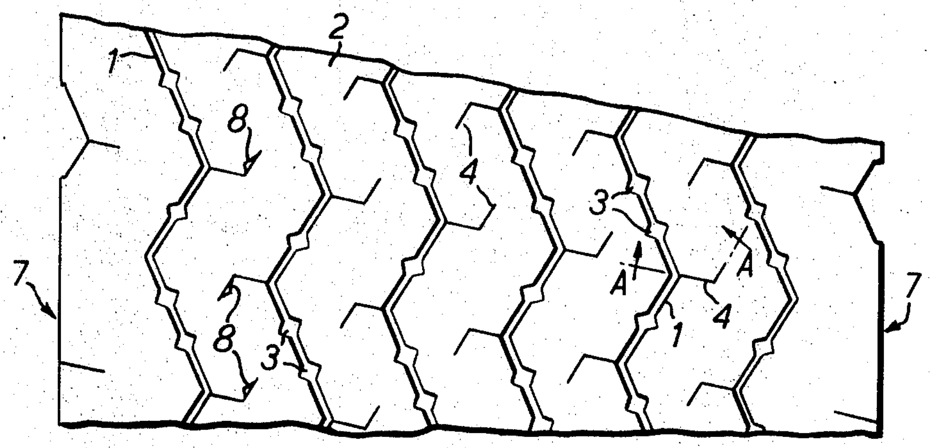
FIG. 2 is a plan view of a tire showing a modification to the first embodiment.
Figure 3:
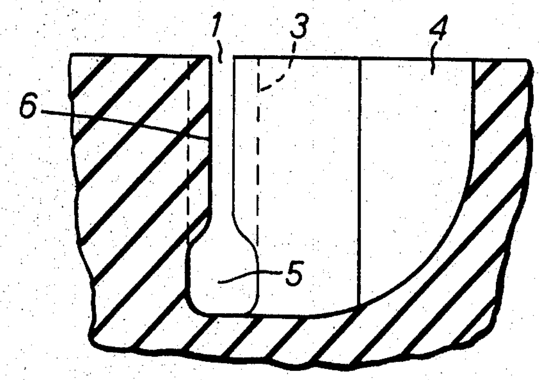
FIG. 3 is a part cross-sectional view across a circumferential groove along the line A–A of the tire shown in FIG. 2 and also a similar view of the tire shown in FIG. 1 with the exclusion of the radially extending conduit represented by the dotted line.

In a modification of the aforesaid embodiment shown in FIG. 2, additional drainage is provided by the provision of radially-extending conduits 3 formed by local widening of the narrow circumferential slots, the conduits leading into the submerged channels and being disposed at intervals around the whole periphery of the tire. Similar radially extending conduits 8 can optionally be used in the slots 4 also.

In a further modification (not shown) the tread may be modified so that instead of, or in addition to, the slots referred to, narrow grooves or slots provided with submerged channels are located between narrow circumferential grooves with the submerged channels of the slots and circumferential grooves interconnecting.

I claim:

1. A pneumatic tire having a tread portion comprising generally circumferentially-extending drainage grooves and lateral substantially L-shaped slots each connecting with a circumferential groove, all the circumferential grooves being of narrow width adjacent to the ground-contacting surface of the tire, some of the circumferential grooves being provided with channel portions of substantially increased relative width adjacent to the groove base and at least some of the circumferential grooves being provided with at least one substantially radially extending conduit, of greater transverse width than that of the narrow groove, leading from the tread ground contacting surface into said channel portions.

2. A pneumatic tire having a tread portion comprising generally circumferentially-extending drainage grooves and lateral slots each connecting with a circumferential groove, all the circumferential grooves being of narrow width adjacent to the ground-contacting surface of the tire, the circumferential narrow grooves being of undulating form with the peaks of adjacent undulations being skewed axially of the tire, some of the circumferential grooves being provided with channel portions of substantially increased relative width adjacent to the groove base and at least some of the circumferential grooves being provided with at least one substantially radially extending conduit, of greater transverse width than that of the narrow groove, leading from the tread ground contacting surface into said channel portions.

3. A pneumatic tire having a tread portion comprising generally circumferentially-extending drainage grooves and transverse narrow slots interconnecting the circumferential grooves, all the circumferential grooves being of narrow width adjacent to the ground-contacting surface of the tire, at least some of the circumferential grooves being provided with channel portions of substantially increased relative width adjacent to the groove base said transverse slots having submerged channel portions leading into the channel portions of the bases of the circumferential grooves to which they are connected, and at least some of the circumferential grooves being provided with at least one substantially radially extending conduit, of greater transverse width than that of the narrow groove, leading from the tread ground contacting surface into said channel portions.

4. A pneumatic tire according to claim 3 wherein at least some of the transverse slots are provided with at least one substantially radially extending conduit of substantially greater circumferential width than the circumferential width of the transverse slot in which it is disposed, leading from the tread ground contacting surface into its channel portion.